US009645913B2

(12) United States Patent
Geist (10) Patent No.: US 9,645,913 B2
(45) Date of Patent: May 9, 2017

(54) METHOD AND APPARATUS FOR DEBUGGING PROGRAMS (76) Inventor: Daniel Geist, Haifa (IL)

(*) Notice: Subject to any disclaimer, the term of this patent is extended or adjusted under 35 U.S.C. 154(b) by 517 days.

(21) Appl. No.: 13/564,079

(22) Filed: Aug. 1, 2012

(65) Prior Publication Data

US 2013/0036403 A1    Feb. 7, 2013

Related U.S. Application Data

(60) Provisional application No. 61/514,533, filed on Aug. 3, 2011.

(51) Int. Cl.
*G06F 9/44* (2006.01)
*G06F 11/36* (2006.01)
*G06F 11/32* (2006.01)

(52) U.S. Cl.
CPC ........ *G06F 11/3664* (2013.01); *G06F 11/323* (2013.01); *G06F 11/362* (2013.01); *G06F 11/366* (2013.01); *G06F 11/3636* (2013.01)

(58) Field of Classification Search
CPC .................................................. G06F 11/362
USPC ........................................................ 717/125
See application file for complete search history.

(56) References Cited

U.S. PATENT DOCUMENTS 6,981,243 B1 * 12/2005 Browning et al. ............ 717/124
2012/0278791 A1 * 11/2012 Geist .............................. 717/125

OTHER PUBLICATIONS

Bill Lewis; "Debugging Backwards in Time"; Fifth Int. Workshop on Automated and Algorithmic Debugging (AADEBUG2003); Sep. 2003.*
Kovacs, Jozsef, et al.; "Integrating temporal assertions into a parallel debugger"; Euro-Par 2002 Parallel Processing; Springer Berlin Heidelberg, 2002; 113-120.*
"Waveform Viewer"; Wikipedia.org website; Sep. 15, 2011.*
Jovitha Jerome; "Virtual Instrumentation Using LabVIEW"; PHI Learning Pvt. Ltd.; Mar. 29, 2010; pp. 131-142, 152.*
"Waveform Graph Cursors"; LabVIEW virtual instrumentation (VI) tutorial pages, National Instruments website (ni.com); Apr. 30, 2010.*
Manna et al., The Temporal Logic of Reactive and Concurrent Systems: Specification, 1992, Springer-Verlag, Berlin.
Sancho et al., Current Practice and a Direction Forward in Checkpoint/Restart Implementations for Fault Tolerance, Proceedings of the 19th IEEE International Parallel and Distributed Processing Symposium (IPDPS'05) Workshop 18, 2005, vol. 19.
Platform PSF, Retrieved at <<http://www.platform.com/workload-management/high-performance-computing/>>, on Jul. 26, 2012.
Ruest et al., Virtualization: A Beginner's Guide, 2009, McGraw Hill.

(Continued)

*Primary Examiner* — Wei Zhen
*Assistant Examiner* — Clint Thatcher
(74) *Attorney, Agent, or Firm* — Tutunjian & Bitetto, P.C.

(57) ABSTRACT

A computer-implemented method, apparatus and computer program product for debugging programs, the method comprising: displaying a graphic waveform showing values of one or more state variables of a computer program being debugged in two or more points in time; receiving a user selection from points in time, of an indication to a selected point in time in execution from the graphic waveform; and resuming within a debugger an execution state of the computer program associated with the selected point in time.

20 Claims, 4 Drawing Sheets

(56) References Cited

OTHER PUBLICATIONS

VMware Virtualization for Desktops, Retrieved at <<http://www.vmware.com>>, on Jul. 26, 2012.
What is Xen, Retrieved at <<http://www.xen.org>>, on Jul. 26, 2012.
Waveform viewer, Retrieved at <<http://en.wikipedia.org/wiki/Waveform_viewer>>, on Jul. 26, 2012.
Saito, Jockey: A user-space library for record-replay debugging, Proceedings of the 6th International Symposium on Automated Analysis, 2005.
Lewis, Better Software Development with Replay Debugging, Retrieved at <<http://www.replaydebugging.com/2008108/vmware-works . . . >> on Jul. 26, 2012.
GDB: The GNU Project Debugger, Retrieved at <<http://www.gnu.org/software/gdb/documentation/>>, on Jul. 26, 2012.
Debugging with IntelliTrace, Retrieved at <<http://msdn.microsoft.com/en-us/dd264915.aspx>>, on Jul. 26, 2012.
Integrated Virtual Debugger for Visual Studio Developer's Guide, Retrieved at <http://www.vmware.com/pdf/ws7_visualstudio_debug/pdf>>, on Jul. 26, 2012.
What Lizard is and how it works, Retrieved at <<http://lizard.sourceforge.net/explain.html>>, on Jul. 26, 2012.
Omniscient Debugging, Retrieved at <<http://lambdadocs.com/debugger>>, on Jul. 26, 2012.

* cited by examiner

METHOD AND APPARATUS FOR DEBUGGING PROGRAMS

CROSS-REFERENCE TO RELATED APPLICATIONS

This application claims the benefit of U.S. Provisional Application No. 61/514,533 filed Aug. 3, 2011, which is hereby incorporated by reference in its entirety.

TECHNICAL FIELD

The present disclosure relates to debugging programs in general, and to techniques and user interfaces for debugging software programs, in particular.

BACKGROUND

Computerized devices control almost every aspect of our life—from writing documents to controlling traffic lights. However, computerized devices are bug-prone, and thus require a testing phase in which the bugs should be discovered. The cost of not discovering a bug may be enormous, as the consequences of the bug may be disastrous. For example, a bug may cause the injury of a person relying on the designated behavior of the computerized device, such as a medical device, a traffic light, or others. Additionally, a bug in a marketed product may be expensive to fix, as patching it may require call-back of devices from the market. Hence, many developers of computerized devices invest a substantial portion of the development cycle in discovering erroneous behaviors of the computerized device.

The testing phase is considered one of the most difficult tasks in designing a computerized device. Debugging is one of the most time consuming tasks of a software developer. Finding bugs and determining their root cause may require significant human and time resources. It is often the case that bugs exhibit unexpected behavior only a long time and many instructions after it was created, which makes discovering it much harder. Generally, as the software is more complex, debugging may take more time and may be more complex and involve more data. Debugging may become especially difficult when the software contains some form of parallel processing, for example software utilizing multiple threads, multiple processors, or the like.

If more efficient and productivity-enhancing tools become available, the faster and more efficient may the debugging process become.

BRIEF SUMMARY

One exemplary embodiment of the disclosed subject matter is a computer-implemented method performed by a computerized device, comprising: displaying a graphic waveform showing values of one or more state variables of a computer program being debugged in two or more points in time; receiving a user selection from the points in time, of an indication to a selected point in time in execution from the graphic waveform; and resuming within a debugger an execution state of the computer program associated with the selected point in time. Within the method, resuming the execution state of the computer program optionally comprises loading a previously stored execution snapshot taken at the selected point in time during execution. Within the method, the execution snapshot optionally comprises one or more items selected from the group consisting of: a call stack, a heap, and a memory image. Within the method, resuming the execution state of the computer program optionally comprises replaying execution of the computer program based on a previously recorded execution. The method may further comprise: receiving one or more program locations within program code of the computer program; receiving the state variables; executing the computer program; and storing values of the state variables when the executed computer program reaches one of the program locations. The method may further comprise storing an execution snapshot when the computer program executed reaches one of the program locations. The method may further comprise modifying the program code to include instructions for storing the state variables. Within the method, one or more of the two or more points in time are optionally determined based on a temporal assertion.

Another exemplary embodiment of the disclosed subject matter is an apparatus having a processing unit and a storage device, the apparatus comprising: a debugger, comprising: a waveform browser for displaying a graphic waveform showing values of one or more state variables of a computer program being debugged in two or more points in time; a man machine interface module for receiving a user selection of an indication to a selected point in time in execution from the graphic waveform; and a state resuming component for resuming within the debugger a state of the computer program associated with the selected point in time in execution. The apparatus may further comprise: a program receiving component; a program locations and state variables receiving code for receiving one or more program locations and the state variables; and a tracer for executing the program and storing values of the state variables when the program reaches the any of the program locations. Within the apparatus, resuming the state of the computer program optionally comprises loading an execution snapshot.

Yet another exemplary embodiment of the disclosed subject matter is a computer program product comprising: a non-transitory computer readable medium; a first program instruction for, displaying a graphic waveform showing values of one or more state variables of a computer program being debugged in yow or more points in time; a second program instruction for receiving a user selection from the points in time, of an indication to a selected point in time in execution from the graphic waveform; and a third program instruction for resuming within a debugger an execution state of the computer program associated with the selected point in time, wherein said first, second and third program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block or blocks of block diagrams.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is determining the point in execution, e.g., the specific instruction or instructions, in which an incorrect instruction is performed. The instruction may be incorrect due to any reason ranging from a small mistake to a major mis-design, however it may be equally important to detect it. The implications of the incorrect instruction may not always be immediately observable, but rather the error may have effect on observable behaviors only later in the execution, sometimes in a location or step which may seem unrelated to the incorrect instruction.

In addition to performing a "step-by-step" execution during a debugging session, a user may desire to restore a state of the program that the program was previously in and the debugger may be instructed to restore the state.

One technique for resuming execution of a previously encountered state is checkpointing, which may consist of storing one or more snapshots of the program execution state. Any of the snapshots may later on be used for restarting execution of the program in that specific state. Checkpointing may be used for debugging and diagnostics, as well as for fault tolerance or load balancing on a computer cluster. In some embodiments, a checkpoint may be loaded using a command line instruction to the debugger.

It will be appreciated that checkpointing can be partial or full, and may be done at various levels, for example storing one or more variable values of the program, storing process level state of a process in a program, storing the entire program state, or even part or all of the state of the computing environment the program was running in. Some virtualization software may provide the ability to checkpoint and store a snapshot of the state of an entire virtual machine.

Some debuggers, referred to as replay debuggers, provide for resuming a previous checkpoint during a run. Some debuggers may provide checkpoint saving such that execution may be resumed to any of the stored states. However, such resuming may not be practical in situations where long runs with many checkpoints are required. Furthermore, the stored checkpoints are only useful within the same interactive session, and checkpoints from previous runs cannot be loaded.

In some exemplary embodiments, checkpointing may save process level information. Additionally or alternatively, checkpointing may be save instruction level information. The saved information may be used to restore the state of the program, either based on the process level information, the instruction level information, or both.

Another technique for resuming execution of a previously encountered state relates to recording or replaying. Using these techniques, rather than saving the execution state, the inputs to the program during execution are recorded and stored. The program can then be replayed with the recorded values used as inputs. The recording can be relatively efficient in time and space. Recording and replaying may also be implemented at different levels, such as at process level, virtual machine level, or the like. In a deterministic program, by replaying the same input, the program will reach the same state. In some exemplary embodiments, pseudo-random inputs may be modified to be deterministic, such as by re-using the same random seed.

Another technical problem dealt with by the disclosed subject matter is to provide a user interface which makes debugging, including the loading of required snapshots more efficient. As more checkpoints are available, the more complex it may be to choose the one to load.

Another technical problem dealt with by the disclosed subject matter is to provide a user with interface for efficiently checking and tracking a program, even if the user is not looking for a specific bug. The user may thus benefit from using debugging tools also in other parts of the development process.

One technical solution comprises the storage of multiple execution states at multiple checkpoints during a preliminary run. The terms checkpoint and program location at which a snapshot is taken may be used interchangeably. At each checkpoint, the values of one or more variables or memory locations of the program are also stored, optionally in a different format or a separate memory or storage area. The preliminary run at which the states and the variables are stored may be performed as part of debugging or at a preliminary stage.

After the preliminary run, a debug session may take place, which may be a continuation of a session at which the preliminary run was performed, or a different session. During the debug session, the values of the variables, as stored at the checkpoints may be presented to a user, for example using a waveform browser.

A waveform browser or viewer may be a software module that visualizes the progress of program execution over time.

The browser may present the values of one or more program variables as functions in time, as detailed below. Although these functions are discrete, they may be displayed, for example in the form of one or more continuous graphs.

It will be appreciated that the time axis of a waveform in accordance with the disclosure may be non-linear, or may even be inconsistent, since the variable values are stored at various checkpoints wherein a time indication may not be provided or available. For example, checkpoints at which variable values are stored may occur at 2 seconds, 10 seconds, 10.05 seconds, 12.4 seconds into the execution, or the like. Thus, the time axis may only represent partial order between the checkpoints.

A user may examine the waveforms of the values as stored during the preliminary run, locate a checkpoint at which the values or the value changes seem of importance, and select that checkpoint. The program state recorded at the checkpoint may then be loaded into the debugger and execution may be resumed therefrom, using all available functionality of the debugger. The user may then select another checkpoint such that execution is resumed at the state recorded at that checkpoint, and so on.

Additionally or alternatively, instead of storing and loading checkpoints, the disclosed subject matter may record the execution and replay it until reaching the selected point in execution. In some embodiments, checkpointing and replay may be combined, by loading a certain checkpoint and continuing with replay from that point on.

One technical effect of the disclosed subject matter relates to displaying values of one or more variables in a program, in one or more checkpoints during an execution of the program. The variables' values may be visualized as waveforms, which may provide a user with a broad view of the behavior of the variable. It will be noted that in some exemplary embodiments, one or more of the values' changes may not be reflected in the waveform, for example if a value changed from 0 to 1 and back to 0 between two checkpoints, but such behavior can be corrected using different or additional checkpoints in another preliminary run.

Another technical effect of the disclosed subject matter relates to providing a method to assume a program state at a point at which one or more variables assume a particular value, change in particular manner, or exhibit any other behavior reflected in the waveform. By selecting a point in the waveform, the state of the program, machine, virtual machine or another environment as recorded during execution, is loaded into the debugger, and debugging may resume from that checkpoint. Resuming execution at the exact checkpoint may save a lot of debugging time of stopping execution at multiple predetermined locations which may not include the erroneous areas of the program.

The disclosed subject matter thus provides for more convenient and efficient debugging. The debugging is made convenient and efficient due to the clear view of variable values during execution of the program, and due to the convenient way of resuming execution at an exact checkpoint without having to go through long execution paths.

Figure 1:
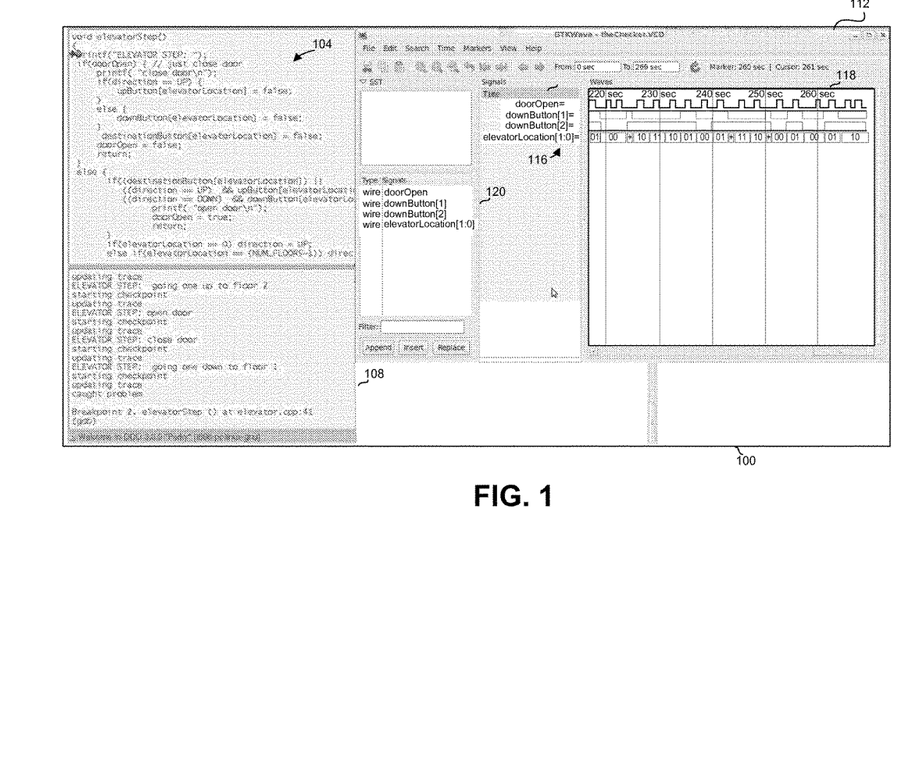
FIG. 1 is an exemplary screenshot of a debugger comprising a waveform browser, in accordance with some exemplary embodiments of the disclosed subject matter.

Referring now to FIG. 1, showing an exemplary screenshot of a debugger comprising a waveform browser. FIG. 1 shows a screenshot 100 of a user interface of a debugger program.

The user interface may display, as common in debuggers, a pane 104 containing a portion of the code of the program being debugged, a tracing pane 108, or other panes or windows which may be used when debugging a program.

Screenshot 100 also comprises window or pane 112, which shows a waveform browser or viewer, or additional related data.

Thus, pane 112 may comprise variable area 116 presenting a list of one or more state variables for which a waveform is available, and waveform area 118 presenting the respective waveforms for the state variables.

Waveform area 118 may comprise vertical indications of the time points for which the state variables are available. For each such time point, an execution snapshot of the program may also be available. However, in some exemplary embodiments, the waveforms in waveform area 118 may comprise values at points in time for which the value of the state variables was recorded but an option to resume the program in that point in the time is not available. In some exemplary embodiments, points in time for which a resume option exists may be presented in a distinguished manner such as using different color or line thickness, using an overlaid vertical line, or any other visual manner.

It will be appreciated that the time points are not necessarily uniformly spaced, and may not even be designated in time units. Rather, consecutive numbering or even no numbering at all can be used.

As seen in area 118, a single Boolean variable, such as the "door open" variable may be depicted using a graph, while more complex variables, such as the elevator location array may be displayed textually. It will be appreciated that different or additional presentation manners may also be used. Each such representation is referred to herein generally as "waveform".

Area 120 may provide a user of the debugger with tools for managing the waveform browser, for example selecting the state variables to be presented, their order, the respective display type, or the like.

A user may select any of the time points from waveform browser 118. Upon receiving the user's selection, the execution snapshot associated with the particular time point may be loaded into the debugger, such that the debugger assumes the same internal states and memory contents as if the program was launched and run as in the preliminary run, until that point. The user may then continue debugging using any available debugging option, or select and load any other time point which may be loaded into the debugger.

In some exemplary embodiments, the definition of points in time may be based on a user-configurable temporal scheme, such as an execution of a pre-defined library function, modification of a value of a predetermined variable, or the like. In some exemplary embodiments, other temporal schemes may be defined, such as for example, those depicted in PCT Publication No. WO 2011/083459 entitled UTILIZING TEMPORAL ASSERTIONS IN A DEBUGGER, by GEIST Daniel, filed on Jan. 2, 2011, which is hereby incorporated by reference in its entirety.

It will be appreciated that a multiplicity of sets of variables may be created, for example using a multiplicity of temporal assertions, each associated with a set of variables. The user may then be presented with a list of the sets and may choose which set he would like to be displayed.

Figure 2:
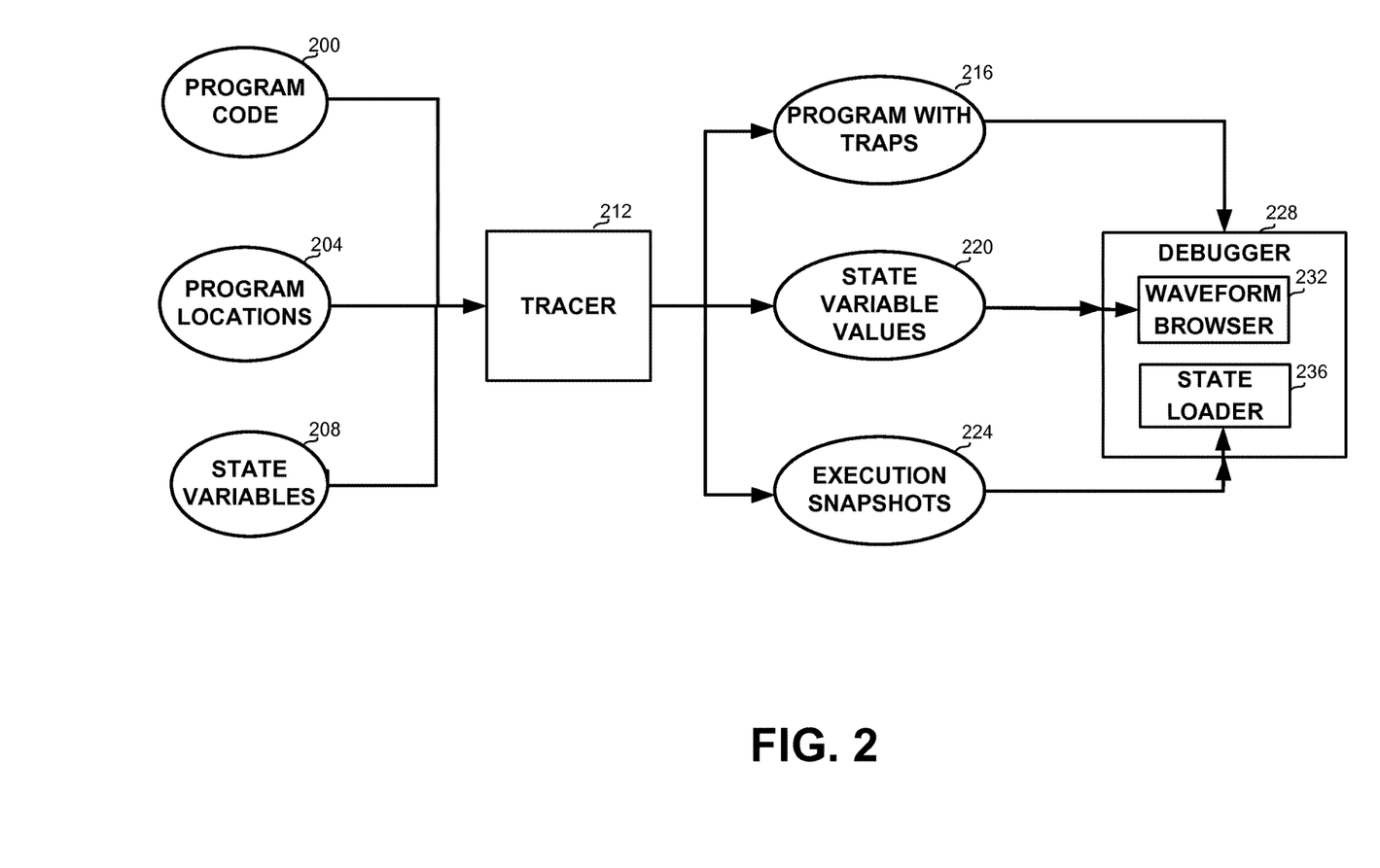
FIG. 2 is a schematic data and components diagram, showing inputs, components and activities in a system and method in accordance with some exemplary embodiments of the disclosed subject matter.

Referring now to FIG. 2 showing a data and components diagram in an apparatus for debugging.

The first input to the system is program code 200, which has to be debugged. Program code 200 may be written in any programming language, such as C, C++, C#, Java, or others.

Another input to the system comprises program locations 204, which relates to locations in the program, which when the program arrives to these locations, execution snapshots and the values of the state variables will be stored. Each location may be indicated, for example, as the beginning of a function, a method, a procedure or other functional unit, a specific instruction selected by a user, an instruction identified using another tool or technique such as temporal assertions, or the like. The location may also be indicated in relative or absolute time units, such as 10 seconds into execution, at 10:0000 AM, which will cause the program to take the snapshots and state variables at the particular time, or the like. Additionally or alternatively, program locations 204 may be defined implicitly based on a user-configurable temporal scheme.

Yet another input to the system comprises state variables 208, which comprises one or more variables of the program, the values of which will be stored when the program reaches any of locations 204, and displayed by the waveform browser. State variables 208 may include global variables which are available throughout execution, local parameters which exist only in a partial scope of the execution, function or method parameters, or the like. The state variables may be selected by a user, identified using another tool or technique such as temporal assertions, or the like.

Program code 200, program locations 204 and state variables 208 are input into a tracer 212, which may or may not constitute a part of a debugger. Tracer 212 may generate and insert instructions into program code 200 at program locations 204, which may cause the program to dump an execution snapshot, and store the current values of the state variables. Tracer 212 may then run the program in a preliminary run, and whenever one of program locations 204 is reached, the dumping instructions are executed, such that an execution snapshot and the state variables are stored. The execution snapshot or the state variable values nay be associated with a time stamp.

In some exemplary embodiments, tracer 212 may operate by creating a subroutine, function, procedure, method or another functional unit that stores the values of state variables 208 when called. Program code 200 may be modified to call this unit when it reaches any of program locations 204 by adding a call to the program code in the location, by adding a breakpoint trap at the location, and causing the program to call this unit whenever it has a breakpoint trap in the location, or in any other manner.

It will be appreciated that tracer 212 may trace the program a-priori, before debugging is started. In this mode, tracer 212 may insert breakpoint traps at any of program locations 204 and may create a modified program 216, such as program with traps. Tracer 212 may then execute the modified program and monitor the program execution. Whenever a relevant trap is reached, the program may be suspended. The tracer may create an execution snapshot of the program execution, and the values of state variables 208 may be dumped. The values may be dumped by appending them into a dump file. Tracing may continue until the program is halted or exits.

In other embodiments of a-priori tracing the program, a variant using record or replay technique may be used by tracer 212. In such embodiments, the entire execution may be recorded using the record/replay technology, such as, for example, by running the tracer inside a virtual machine that has execution recording turned on. It will be appreciated, however, that record/replay technology may be used in other contexts and is not limited to virtual machines. When using record/replay the tracer does not have to output snapshots, but only to dump the values of state variables 208. In some embodiments, the program may be run without the tracer, by inserting a call to the unit that dumps the values at program locations 204. In some exemplary embodiments, during recordation of the execution, inputs provided to the program may be recorded to be provided as inputs if the execution is to be replayed.

Alternatively, tracer 212 may be run from within a debugger. In this mode the tracer may be integrated into a debugger, such as debugger 228. A debugger may use an internal tracer to run the program as described above. The debugger may insert breakpoint traps in program locations 204 and monitor program execution. Whenever a relevant trap is reached, the program is suspended, the debugger creates a snapshot of the program execution, and the unit that stores the values of state variables 208 is also called. Tracing may continue until the program is halted.

Tracer 212 may or may not output the program with the added instructions, such as modified program 216, and may output one or more sets of state variable values 220 and one or more execution snapshots 224, depending on the number of program locations 204 reached during the preliminary run.

Modified program 216 may be input into a debugger 228. Alternatively, a pointer to a location at which state variables 220 and execution snapshots 224 can be retrieved from, may be provided. In addition to known features of a debugger, debugger 228 may comprise waveform browser 232 for displaying one or more waveforms of state variables 220, optionally along with the respective time stamps.

Debugger 228 may also comprise state loader 236 for loading any of execution snapshots 224, such that the current execution state of debugger 228 is identical to the state as stored at one of the locations 204.

Debugger 228 may operate such that a user may select a particular point using waveform browser 232, and the execution snapshot taken at that time is loaded by state loader 236.

When record/replay techniques is used, execution snapshots 224 may not exist. Rather a time value on the waveform browser may correspond to a location in program code 200. In case the same location is executed more than once, a time value may correspond also to a number of times the program has passed through the location when the corresponding state was reached. In the case of a virtual machine record/replay, a debugger may be used, which can attach itself to a virtual machine replay. With record/replay technology, the replay may be run until it reaches that program location the exact same number of times. In order to implement this behavior, the replay technology may be augmented with a command that causes it to replay the program until the location is reached for the desired number of times during the reply execution. For example, if the time value selected corresponds to reaching line number 10123 for the 34th time, then the execution of the replay may be paused when line 10123 is reached and is executed for the 34th time.

Figure 3A:
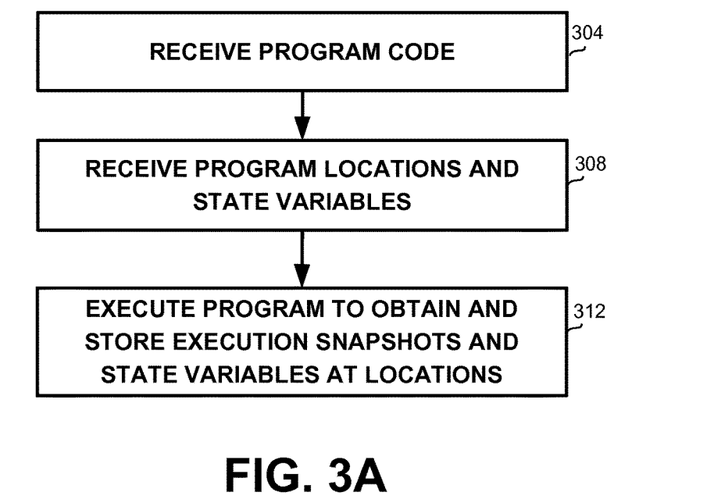
FIG. 3A is a flowchart of steps in a method for preparing a program for debug, in accordance with some exemplary embodiments of the disclosed subject matter.
Figure 3B:
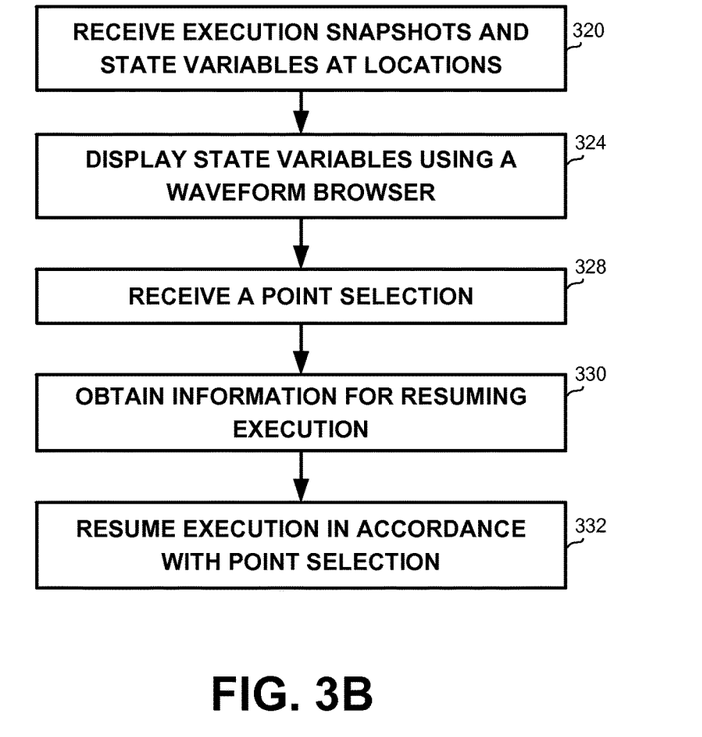
FIG. 3B is a flowchart of steps in a method for debugging a program, in accordance with some exemplary embodiments of the disclosed subject matter.

Referring now to FIGS. 3A and 3B, showing flowcharts of steps in a method for preparing a program for debug, and debugging the program, respectively, in accordance with some exemplary embodiments of the disclosed subject matter.

On step 304 of FIG. 3A, the program code may be received, for example by a tracer, which may or may not be part of a debugger.

On step 308, the program locations and state variables may also be received by the tracer.

On step 312, the program may be executed by the tracer. Whenever the program reaches any of the program locations, information useful for resuming the execution from the same point (e.g., snapshot, replay information, or the like) may be obtained, and the values of the state variables may be stored, optionally along with a respective time stamp, which may be absolute, relative to the start of the program execution, or to any other time.

In some exemplary embodiments, the information useful for resuming execution may be an execution snapshot. The execution snapshot may comprise the call stack, heap, memory image, or the like.

Referring now to FIG. 3B showing a flowchart of steps in a method for debugging a program, after the preparation showed for example in FIG. 3A.

On step 320, values of the state variables may be received by the debugger.

On step 324, the values of the state variables may be graphically displayed by the debugger, for example using a waveform browser which may use and display the associated time stamps. The waveform browser may be displayed on a separate pane of the debugger, on a modal or modeless window, or the like. Each state variable may be displayed as a wire graph, a histogram, a sequence of numeric values, or the like. The presentation type may be selected by a user and may be changed. It will be appreciated that one or more graphs may be incomplete, due for example to variables that exist only in a partial scope of the program.

On step 328, the debugger may receive from a user an indication to a point in execution of the program or a point in time, in the waveform browser. The indication may be received by a user pointing at a location on the waveform browser, entering a value, or the like. In some exemplary embodiments, the user may select the point in execution using a graphical user interface, and optionally using a pointing device or a pointing mechanism such as a mouse or a touch screen.

On step 330, the debugger may obtain information useful for resuming the execution at the selected point. In some exemplary embodiments, the debugger may obtain an execution snapshot corresponding to the time selection. Additionally or alternatively, the debugger may obtain replay information corresponding to the selection. In some exemplary embodiments, the debugger may a-priori obtain all relevant information (e.g., all checkpoints associated with all possible points of selection) and may determine the relevant information based on the selection.

On step 332, the debugger may resume an execution state in accordance with the time point received from the user. In some embodiments, the resuming may be performed by loading an execution snapshot associated with the time point. Since the waveform browser indicates the values of the state variables at time points, and at each such point an execution snapshot is take, such snapshot may exist for the particular time point. In embodiments in which record/replay technique is used, a time value on the waveform browser may correspond to the number of times the program has passed through a location when the corresponding state was reached. Thus, the replay may be run until it reaches the program location the same number of times.

Figure 4:
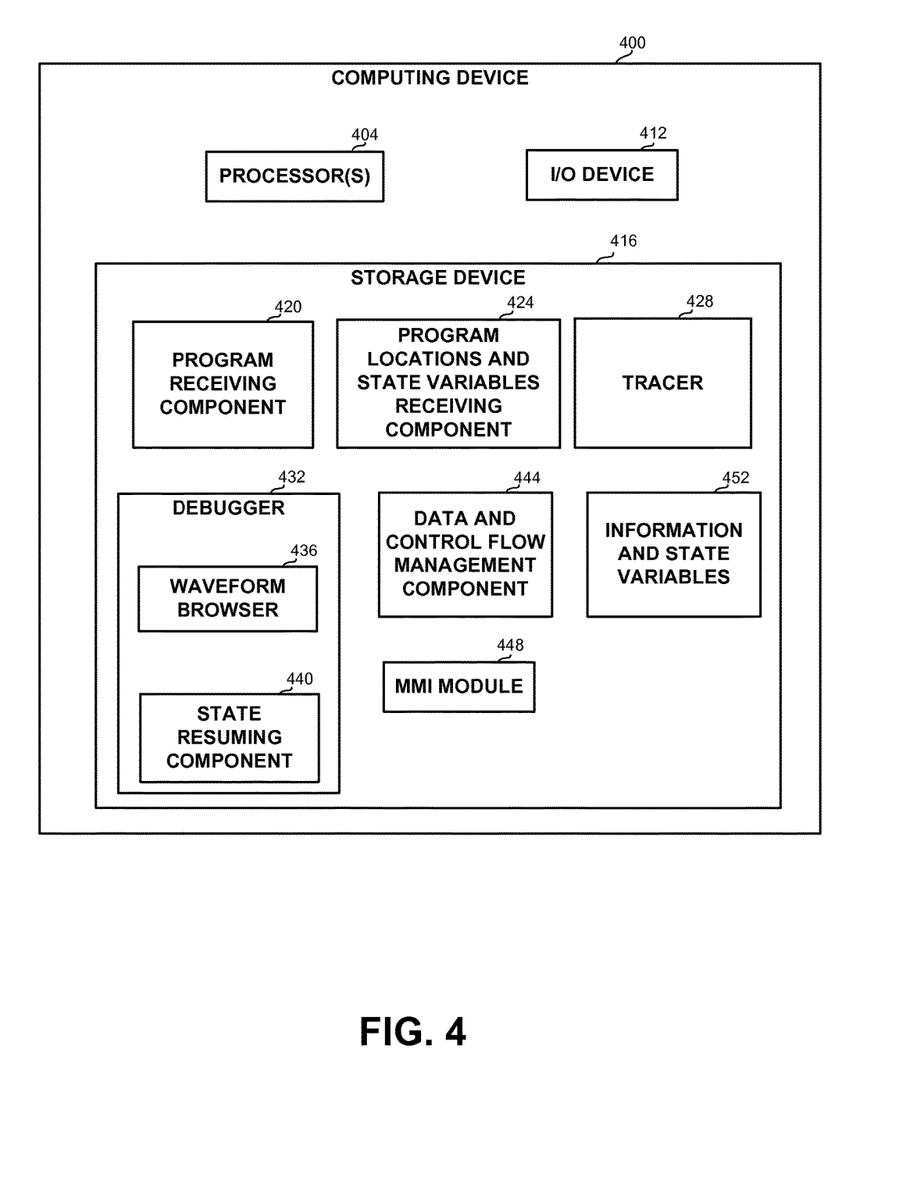
FIG. 4 shows a block diagram of components of an apparatus for debugging programs, in accordance with some exemplary embodiments of the disclosed subject matter.

Referring now to FIG. 4, showing a block diagram of components in an apparatus for debugging programs.

The apparatus comprises a computing device 400, which may comprise one or more processors 404. Any of processors 404 may be a Central Processing Unit (CPU), a microprocessor, an electronic circuit, an Integrated Circuit (IC) or the like. Alternatively, computing device 400 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 404 may be utilized to perform computations required by computing device 400 or any of it subcomponents.

In some embodiments, computing device 400 may comprise an input-output (I/O) device 412 such as a terminal, a display, a keyboard, a microphone or another audio input device or the like, used to interact with the system, to invoke the system and to receive or view the results.

Computing device 400 may comprise one or more storage devices 416 for storing executable components. Storage device 416 may also contain data during execution of one or more components. Storage device 416 may be persistent or volatile. For example, storage device 416 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 416 may retain program code operative to cause any of processors 404 to perform acts associated with any of the steps shown in FIG. 3A or FIG. 3B above, for example preparing a program for debug, displaying a waveform browser, or the like.

The components detailed below may be implemented as one or more sets of interrelated computer instructions, executed for example by any of processors 404 or by another processor. The components may be arranged as one or more executable files, dynamic libraries, static libraries, methods, functions, services, or the like, programmed in any programming language and under any computing environment. Storage device 416 may comprise or be loaded with one or more of the components, which can be executed on computing platform 400 by any one or more of processors 404. Alternatively, any of the executable components may be executed on any other computing device which may be in direct or indirect communication with computing platform 400.

Storage device 416 may comprise program receiving component 420 for receiving code of a program to be debugged. Program receiving component 420 may be implemented as part of a development environment, by which a user may input or import code.

Storage device 416 may also comprise program locations and state variables receiving component 424 for receiving the program locations and state variables. Program locations and state variables receiving component 424 may be implemented as part of a development environment.

Yet another component which may be loaded to storage device 416 is tracer 428, which may be configured to receive the program code, program locations and state variables, and to output or store information useful for resuming execution (e.g., execution snapshots or record/replay information) and values of the state variables when the program reaches any of the program locations.

Storage device 416 may also comprise debugger 432, which comprises in addition to debugging components also a waveform browser 436 for presenting as waveforms the values of the state variables as output by tracer 428, and state resuming component 440 for resuming the execution state when the program was run by the tracer and passed through the program location. If execution snapshots are stored, the relevant execution snapshot is loaded and debug may continue.

It will be appreciated that tracer 428 may be implemented as part of debugger 432 or as a module independent of debugger 432. It will also be appreciated that tracer 428 and debugger 432 may be implemented on different computing devices, such that debugger 432 may receive the execution snapshots and state variables values online or offline.

Storage device 416 may also comprise data and control flow management component 444 for managing the flow of data and control between the components, for example transferring program code, program locations and state variables received by program receiving component 420 and program locations and state variables receiving component 424 to tracer 428, and the output of tracer 428 to debugger 432 or any of its subcomponents.

Yet another component of storage device 416 may be MMI module 448. MMI module 448 may be utilized to provide communication between the apparatus and a user for providing input, receiving output or the like. For example, MMI module 448 may be related to a debugger program or a development environment and may be used for receiving from a user an indication, for example via the waveform browser, to a time for which it is required to load an execution snapshot.

Storage device 416 may also comprise one or more data structures, such as one or more execution snapshots or state variables values taken in any of the indicated program locations, or the like.

In some exemplary embodiments, Storage device 416 may retain information useful for resuming execution and state variables (452). The retained information may be determined by tracer 428 and may be used in whole or in part by debugger 432.

It will be appreciated that the disclosed methods and apparatus may be implemented on any kind of hardware programming platform and on any kind of operating system platform which enables to suspend a process to take a snapshot, record inputs of the process for later replay or provides a virtualization software for this platform exists which has record/replay capability. The hardware programming platform should also provide or enable the development of a debugger that may present a waveform browser. Such hardware platform may be any computing platform such a server, desktop, laptop, etc. alternatively, the hardware platform may be an embedded system, a handheld device, a game console, a graphics device, or the like, or a virtual machine. The platform may operate with any operating system, such as but is not limited to Windows, Linux, MacOS, AIX, Solaris, z/VM, or others.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    displaying a graphic waveform showing values of at least two state variables of a computer program being debugged in at least two points in time, wherein the graphic waveform displaying a timeline indicating for each of the at least two points in time, values of each of the at least two state variables;
    receiving a user selection from the graphic waveform, wherein the user selection is a selection of a selected point in time in execution which is graphically displayed in the graphic waveform; and
    resuming within a debugger an execution state of the computer program associated with the selected point in time.

2. The computer-implemented method of claim 1, wherein resuming the execution state of the computer program comprises loading a previously stored execution snapshot taken at the selected point in time during execution.

3. The computer-implemented method of claim 2, wherein the execution snapshot comprises at least one item selected from the group consisting of: a call stack, a heap, and a memory image.

4. The computer-implemented method of claim 1, wherein resuming the execution state of the computer program comprises replaying execution of the computer program based on a previously recorded execution.

5. The computer-implemented method of claim 1, further comprising:
    receiving at least one program location within program code of the computer program;
    receiving the at least one state variable;
    executing the computer program; and
    storing values of the at least one state variable when the executed computer program reaches one of the at least one program location.

6. The computer-implemented method of claim 5 further comprising storing an execution snapshot when the computer program executed reaches one of the at least one program location.

7. The computer-implemented method of claim 5 further comprising modifying the program code to include instructions for storing the at least one state variable.

8. The computer-implemented method of claim 1, wherein at least one of the at least two points in time is determined based on a temporal assertion.

9. An apparatus having a processor and a memory, the apparatus comprising:
    a debugger, comprising:
        a waveform browser for displaying a graphic waveform showing, at the same time, values of at least two state variables of a computer program being debugged in at least two points in time, wherein the graphic waveform displaying a timeline indicating for each of the at least two points in time, values of each of the at least two state variables;
        a man machine interface module for receiving a user selection from the graphic waveform, wherein the user selection is a selection of a selected point in time in execution which is graphically displayed in the graphic waveform; and
        a state resuming component for resuming within the debugger a state of the computer program associated with the selected point in time in execution.

10. The apparatus of claim 9, further comprising:
    a program receiving component;
    a program locations and state variables receiving code for receiving at least one program location and the at least one state variable; and
    a tracer for executing the program and storing values of the at least one state variable when the program reaches the at least one program location.

11. The apparatus of claim 9, wherein resuming the state of the computer program comprises loading an execution snapshot.

12. A computer program product comprising:
    a non-transitory computer readable medium;
    a first program instruction for displaying a graphic waveform showing, at the same time, values of at least two state variables of a computer program being debugged in at least two points in time, wherein the graphic waveform displaying a timeline indicating for each of the at least two points in time, values of each of the at least two state variables;
    a second program instruction for receiving a user selection from the graphic waveform, wherein the user selection is a selection of a selected point in time in execution which is graphically displayed in the graphic waveform; and
    a third program instruction for resuming within a debugger an execution state of the computer program associated with the selected point in time,
    wherein said first, second and third program instructions are stored on said non-transitory computer readable medium.

13. The computer-implemented method of claim 1 further comprises:
    receiving program locations or definition thereof;
    executing the computer program, wherein during said executing the program, upon reaching any of the program locations, storing an execution snapshot; and
    wherein the graphic waveform displays values of the at least one state variable only in points in time that correspond to the execution reaching any of the program locations.

14. The computer-implemented method of claim 1, wherein the graphic waveform does not show values of at least one variable of the computer program.

15. The computer program product of claim 12, wherein the user selection is a selection performed by the user by explicitly pointing on the selected point in time using a pointing device or a pointing mechanism.

16. The computer program product of claim 12, wherein the selected point in time is a selection of any time point displayed in the graphic waveform.

17. The apparatus of claim 9, wherein the user selection is a selection performed by the user by explicitly pointing on the selected point in time using a pointing device or a pointing mechanism.

18. The apparatus of claim 9, wherein the selected point in time is a selection of any time point displayed in the graphic waveform.

19. The computer implemented method of claim 1, wherein the user selection is a selection performed by the user by explicitly pointing on the selected point in time using a pointing device or a pointing mechanism.

20. The computer implemented method of claim 1, wherein the at least two state variables comprise a local variable which exists only in a partial scope of the execution, wherein the graphic waveform of the local variable is an incomplete graph which does not show values in points in time in the execution where the local variable does not exist.

* * * * *